United States Patent
Goldstein et al.

(10) Patent No.: US 6,330,372 B1
(45) Date of Patent: Dec. 11, 2001

(54) COMPRESSION EDGE ADAPTIVE VIDEO AND IMAGE SHARPENING AND SCALING

(75) Inventors: Judith A. Goldstein, Hillsboro; Thomas P. O'Rourke, Portland; Rajeeb Hazra, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/394,151

(22) Filed: Sep. 13, 1999

(51) Int. Cl.[7] .............................. G06T 5/20; G06T 5/50; H04N 1/409
(52) U.S. Cl. ................... 382/266; 382/261; 382/262; 382/263
(58) Field of Search .................... 382/266, 268, 382/269, 263, 260, 261, 262, 130, 199; 358/447

(56) References Cited

U.S. PATENT DOCUMENTS

| 4,782,399 | * | 11/1988 | Sato ........................................ 358/447 |
| 5,172,227 |   | 12/1992 | Tsai et al. . |
| 5,524,162 |   | 6/1996  | Levien ................................... 382/263 |
| 6,021,256 | * | 2/2000  | Ng et al. ............................... 382/266 |
| 6,091,511 | * | 7/2000  | Ben Dror et al. ..................... 382/266 |

FOREIGN PATENT DOCUMENTS

| 0398861  | 11/1990 | (EP) | ................................ H04N/1/40 |
| 0721286  | 7/1996  | (EP) | ................................ H04N/7/30 |
| 97/40627 | 10/1997 | (WO) | ............................... H04N/7/30 |

OTHER PUBLICATIONS

O'Rourke, T.P., et al., "Improved Image Decompression for Reduced Transform Coding Artifacts", *IEEE Transactions On Circuits and Systems for Video Technology*, 5, 490–499, (Dec. 1995).

Reichenbach, S.E., et al., "Two–Parameter Cubic Convolution for Image Reconstruction", *SPIE Visual Communications and Image Processing IV*, 1199, 833–840, (Nov. 8–10, 1989).

* cited by examiner

*Primary Examiner*—Scott Rogers
(74) *Attorney, Agent, or Firm*—Schwegman, Lundberg, Woessner & Kluth, P.A.

(57) ABSTRACT

In one embodiment, a method comprises the detection of an edge pixel in an unsharpened image. The edge pixel is sharpened to form a sharpened image. Additionally, a region of the sharpened image is selected such that the region includes the edge pixel. The region of the sharpened image is compared to a corresponding region of the unsharpened image to form a difference value. The difference value is then processed to form a final image.

23 Claims, 5 Drawing Sheets

COMPRESSION EDGE ADAPTIVE VIDEO AND IMAGE SHARPENING AND SCALING

FIELD

The present invention relates to image and video processing and, in particular, to adaptive sharpening of an image or video frame.

BACKGROUND

Applications that use and display compressed video often must prepare video for transmission over a communications pipeline such as ordinary phone lines (i.e., Plain Old Telephone Service) (POTS)) or Integrated Services Digital Network (ISDN), which provide a limited bandwidth through which the video or image must be transmitted. In particular, an image is defined to include both a still image or a video frame within a stream of video frames. This limitation on the bandwidth imposes a qualitative upper bound on the video compressed with state of the art algorithms. In general, the compressing of video or image data is a lossy process and a consequence thereof is the manifestation of compression artifacts which are products introduced into the image as a result of compression that do not exist otherwise. Moreover, compression subjects the image to a general loss of detail. Despite these limitations, application users, typically, want bigger images (i.e., images occupying a significantly greater percentage of the display screen area) to see scene detail.

When images are small, the eye is forgiving. However when scaling images to larger sizes, the small defects (e.g., the artifacts or loss of detail and texture) due to the compression become extremely visible causing the image to frequently appear "washed out" as the same information is spread over a larger area. To avoid this "washed out" effect, sharpening filters are applied to help bring some more definition and crispness to images. However, compression artifacts and other defects must be taken into account during the sharpening process. Otherwise, these defects are sharpened along with the image, causing the image to look even worse than if no sharpening was performed. Therefore, for these and other reasons there is a need to adaptively sharpen certain portions of an image.

SUMMARY

In one embodiment, a method for edge adaptive image sharpening comprises the detection of an edge pixel in an unsharpened image. Additionally, the edge pixel is sharpened to form a sharpened image. A region of the sharpened image is selected such that the region includes the edge pixel. In one embodiment, the selected region of the sharpened image is centered around the edge pixel that has been sharpened. This region of the sharpened image is compared to a corresponding region of the unsharpened image to form a difference value. The difference value is then processed to form a final image.

DESCRIPTION OF DETAILED EMBODIMENTS

In the following detailed description of the exemplary embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "computing", "calculating", "determining", "displaying" or the like, refer to the actions and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices. Additionally, the term image is defined to include both a still image or a video frame within a stream of video frames.

Figure 1:
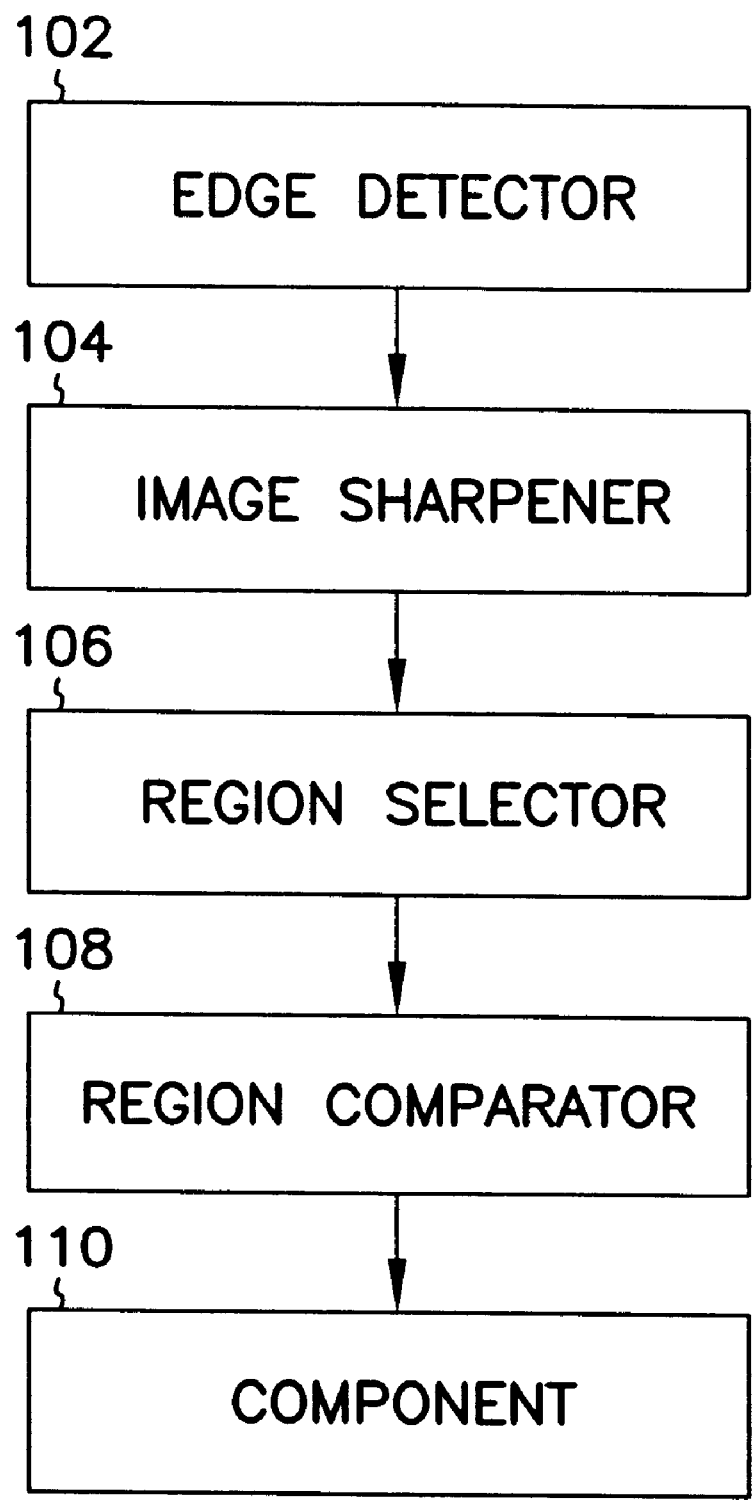
FIG. 1 is a block diagram of a system in accordance with an embodiment of the invention.

Referring first to FIG. 1, a block diagram of a system according to one embodiment of the invention is shown. The system of FIG. 1 includes edge detector 102, image sharpener 104, region selector 106, region comparator 108 and component 110. Edge detector 102, image sharpener 104, region selector 106, region comparator 108 and component 110 are desirably part of a computer, although the invention is not so limited. In such an embodiment, edge detector 102, image sharpener 104, region selector 106, region comparator 108 and component 110 are desirably computer programs on a computer—i.e., programs (viz., an edge detector program, a image sharpener program, a image comparator program, region selector program and a component program) executed by a processor of the computer from a computer-readable medium such as a memory thereof. The computer also desirably includes an operating system within which and in conjunction with which the programs run, as can be appreciated by those within the art.

Figure 2A:
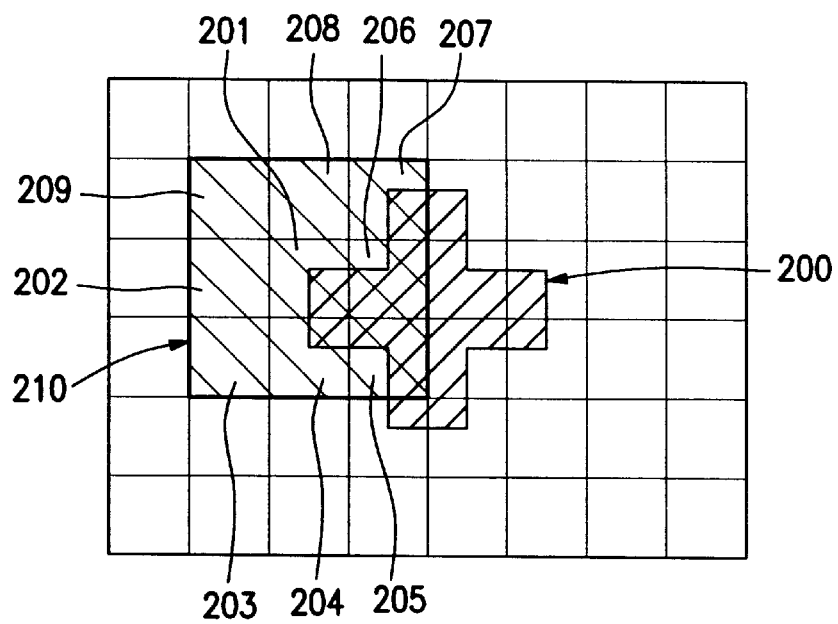
FIGS. 2A–2C are illustrations of an unsharpened image, a corresponding edge map and a corresponding sharpened image, respectively.

Edge detector 102 receives an unsharpened image and detects one to a number of edge pixels therein. An edge is defined as a large enough change in intensity within a short distance, while edge pixels are defined as those pixels in the image that reside along edges of the image. For example, FIG. 2A includes an unsharpened image of a cross 200, such that the pixels internal to cross 200 have an intensity value ranging from 128 to 255 while the pixels external to cross 200 have an intensity value of zero. Moreover, the unsharpened image of FIG. 2A is broken into a number of pixels including pixels 201–209. Additionally, the unsharpened image of FIG. 2A includes a region 210 which is comprised of pixels 201–209. Pixels 201, 204, 205, 206 and 207 are considered edge pixels because these pixels are located along edges of cross 200. In contrast, pixels 202, 203, 208 and 209 are not edge pixels as these pixels are not part of any object edge including edges of cross 200.

In one embodiment, edge detector 102 comprises an edge map generator for creating an edge map for the unsharpened image, in order to determine the location of edge pixels along object edges in the image, as is well-known in the art. In an edge map, high values typically indicate edges and correspondingly low values indicate flat areas. In another embodiment, edge detector 102 comprises a two-dimensional (2-D) Sobel sharpening filter, which is known in the art, to create the edge map from the Y frame. Moreover, a 3×3 median filter, which is also well-known in the art, can then be used to filter the edge map, to eliminate spurious edge points.

Figure 2B:
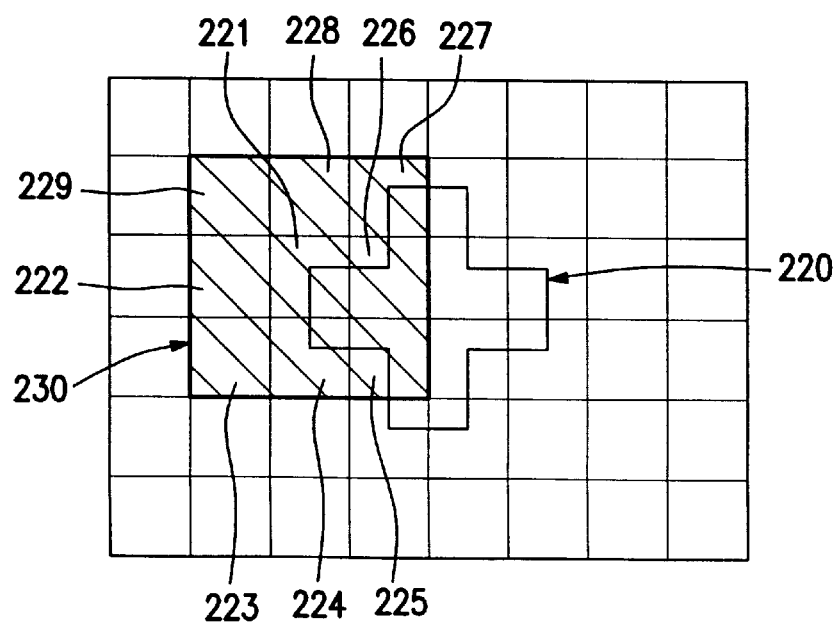

Accordingly in one embodiment, edge detector 102 creates a corresponding edge map for cross 200 (i.e., cross 220), as illustrated in FIG. 2B. In particular, the edge map in FIG. 2B includes only the edges of cross 200, such that the pixels internal and external to cross 220 have an intensity value of zero. Moreover, the edge map of FIG. 2B is broken into a number of pixels including pixels 221–229, which correspond to pixels 201–209 of FIG. 2A, respectively. Additionally, the edge map of FIG. 2B includes a region 230 which is comprised of pixels 221–229, which corresponds to region 210 of FIG. 2A.

Image sharpener 104 receives the edge pixels and sharpens those pixels, thereby forming a sharpened image. In one embodiment, image sharpener 104 comprises a 2-D sharpening filter that is applied to a Y plane of the edge pixels in the unsharpened image to sharpen the edge pixels. In one embodiment, image sharpener 104 comprises a mechanism for dynamic sharpening. The mechanism for dynamic sharpening allows the sharpening to be tuncable. For example, a user of this process, such as an person looking at an image at a computer terminal, can control how much or little sharpening is performed on the image.

Region selector 106 receives the sharpened image for each edge pixel and selects a region of the sharpened image, such that the region includes an edge pixel. In one embodiment, region selector 106 selects a region within the sharpened image such that the selected region is centered around the edge pixel. In other, words, the edge pixel is in the middle of the selected region. The size of the region is tuned to the amount of noise (e.g., compression and system noise) in the image. For example, if the image is considered very noisy, the size of the region is increased in order to average out over a larger region. In one embodiment, the size of the region is 5×5. In another embodiment, the size of the region is not static. The range of sizes can vary between one pixel and the entire image size. This allows for a range of comparisons between the unsharpened and sharpened image (e.g., a pixel by pixel comparison). It is important, however, to appreciate that the region is not limited to any particular size or shape (e.g., square, rectangular or circular).

To prevent a large change (usually due to spurious noise) between the sharpened and unsharpened image, a check is performed to determine whether to accept or reject the new sharpened value for a particular edge pixel. In particular, region comparator 108 performs this check by receiving each region that corresponds to each edge pixel and comparing each region to the corresponding region of the unsharpened image to form a difference value for each set of regions that correspond to an edge pixel.

Figure 2C:
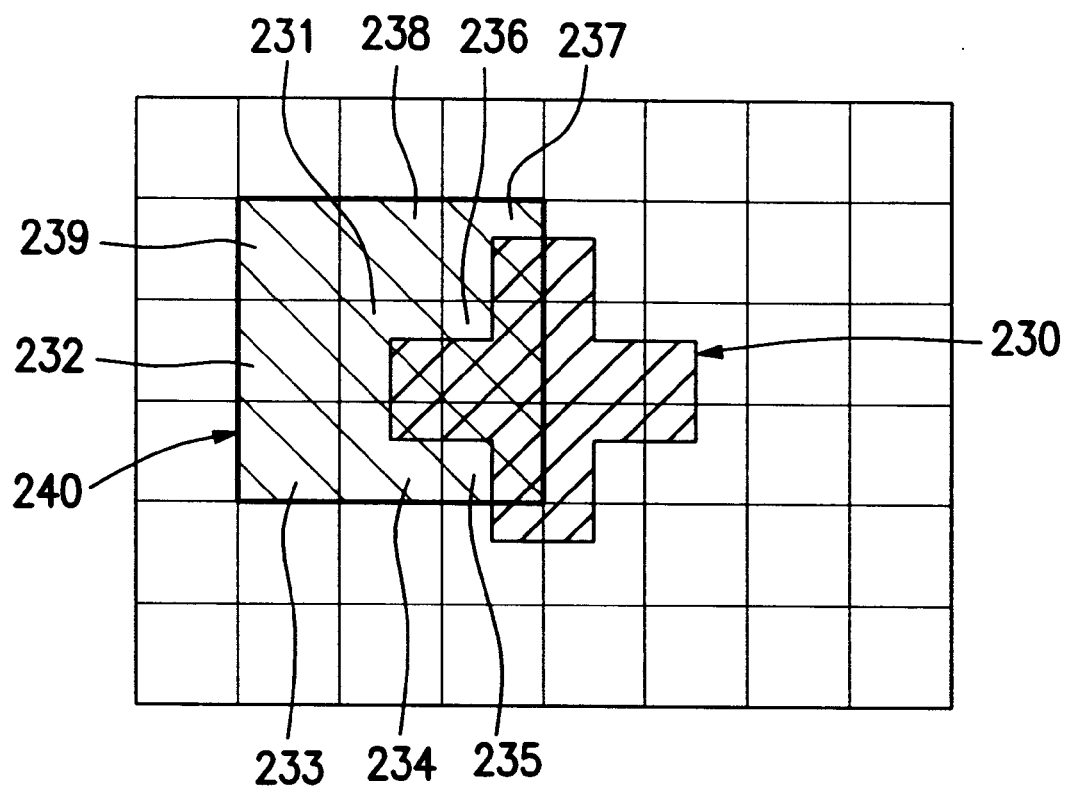

The corresponding region of the unsharpened image is that region of the unsharpened image that is in the same location as the region of the sharpened image. For example referring back to FIG. 2A, this figure includes an unsharpened image of cross 200, wherein the unsharpened image is broken into a number of pixels including pixels 201–209 and also includes region 210. FIG. 2C includes a sharpened image of cross 200 (i.e., cross 230), wherein the sharpened image is broken into a number of pixels including pixels 231–239. Further, FIG. 2C includes region 240 which is comprised of pixels 231–239. In FIGS. 2A and 2C, region 210 of FIG. 2A corresponds to region 240 of FIG. 2C, as regions 210 and 240 are in the same location within the different images.

For each edge pixel, region comparator 106 compares the two selected regions for each edge pixel, thereby generating a difference value between these two regions. In one embodiment, this comparison of regions and generation of a difference value comprises the calculation of the sum of the absolute differences between the two regions, as is well-known in the art. In another embodiment, this comparison of regions and generation of a difference value comprises the calculation of the mean square error between the two regions, which is also well-known in the art. Therefore, a difference value is generated for each set of regions (i.e., the region from the sharpened image and the corresponding region from the unsharpened image) so as to correspond to each edge pixel. In other words, there is a difference value associated with each edge pixel.

Component 110 then receives each of the difference values for each edge pixel and processes these difference values to form (i.e. generate) a final image. Component 110 processes the difference values to determine whether to accept or reject the new sharpened value for each edge pixel. In one embodiment, component 110 selects the edge pixel in the sharpened image (i.e., the sharpened value for that particular edge pixel) if the difference value is less than a predetermined threshold. Conversely, component 110 selects the edge pixel in the unsharpened image (i.e., the unsharpened value for that particular edge pixel) if the difference value is greater than or equal to the predetermined threshold.

This predetermined threshold is chosen to reflect the level of noise (e.g., compression and system noise)—the greater the noise, the lower the threshold and vice versa. The assumption is made that if the change between the unsharpened region and the sharpened region is large enough (i.e., the threshold value is exceeded), it is due to noise in the data or the area is an edge boundary condition. Either way the sharpened value for any particular edge pixel is discarded in favor of the unsharpened value because otherwise there will be a dramatic difference in the appearance of the image.

One reason for adaptive sharpening a image is to allow the size of the image to be scaled up (i.e., zoomed) while avoiding the "washed out" effect while at the same time de-emphasizing compression artifacts. Because zooming is a blurring process, in one embodiment, an image scaler receives the unsharpened image and scales up the size of the unsharpened image prior to having edge detector 102 detect the edge pixels in the unsharpened image. The zooming up of the image can also occur subsequent to the sharpening process. In this embodiment, the blurring process associated with the zooming of the image is accounted for by over sharpening the image.

Figure 3:
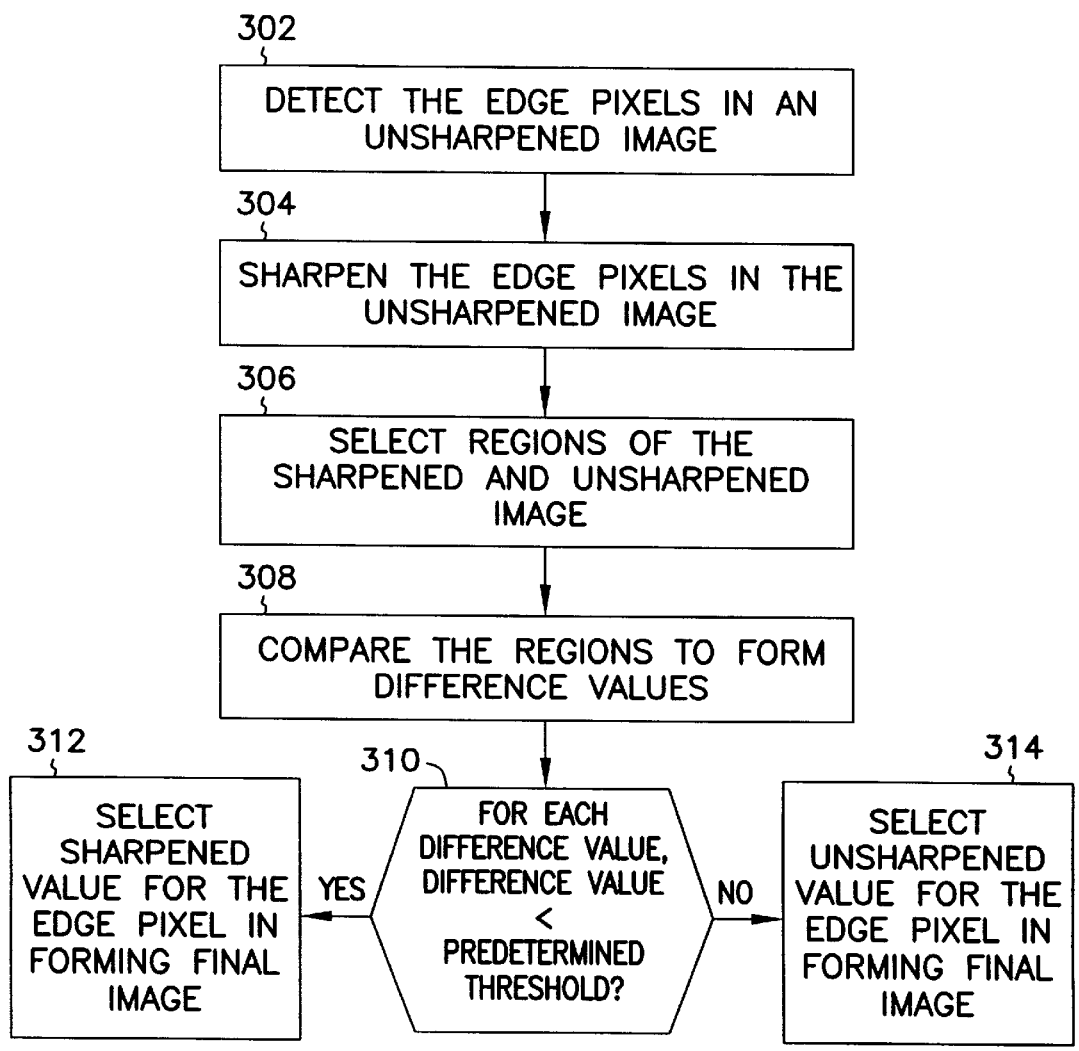
FIG. 3 is a flowchart of a method in accordance with an embodiment of the present invention.

Referring next to FIG. 3, a flowchart of a method in accordance with an embodiment of the invention is shown. The method is desirably realized at least in part as one or more programs running on a computer—that is, as a program executed from a computer-readable medium such as a memory by a processor of a computer. The programs are desirably storable on a computer-readable medium such as a floppy disk or a Compact Disk-Read Only Memory (CD-ROM), for distribution and installation and execution on another (suitably equipped) computer.

In block 302, one to a number of edge pixels of an unsharpened image are detected. In one embodiment, an edge map for the image is created to determine the location of edge pixels along object edges in the image, as is well-known in the art. In an edge map, high values typically indicate edges and correspondingly low values indicate flat areas. In another embodiment, a two-dimensional (2-D) Sobel sharpening filter, which is well-known in the art, is used to create the edge map from the Y frame. The edge map can then be filtered through a 3×3 median filter, which is also well-known in the art, to eliminate spurious edge points.

In block 304, the edge pixels that were detected in block 302 are sharpened to form a sharpened image. In one embodiment, the edge pixels in the image are sharpened by applying a 2-D sharpening filter to a Y plane. In one embodiment, the sharpening process is dynamic. In other words, the sharpening filter is tuneable. As previously explained, a user of this process, such as a person watching a video sequence at his television or an individual looking at an image at a computer terminal, can control how much or little sharpening is performed on the image.

In block 306, regions of the sharpened image are selected to corresponds to each edge pixel, such that the region includes an edge pixel. The size of the region is tuned to the amount of noise (e.g., compression and system noise) in the image. For example, if the image is considered very noisy, the size of the region is increased in order to average out over a larger region. In one embodiment, the size of the region is 5×5. In another embodiment, the size of the region is not static. The range of sizes can vary between one pixel and the entire image size. This allows for a range of comparisons between the unsharpened and sharpened image (e.g., a pixel by pixel comparison). It is important, however, to appreciate that the region is not limited to any particular size.

To prevent a large change between the sharpened and unsharpened image, a check is performed in block 308 to determine whether to accept or reject the new sharpened value for a particular edge pixel. In particular, this check is performed by comparing regions of the sharpened image to corresponding regions of the unsharpened image. The corresponding region of the unsharpened image is that region of the unsharpened image that is in the same location as the region of the sharpened image.

For each edge pixel, a comparison of the two selected regions for each edge pixel is performed. Comparing two corresponding regions for a particular edge pixel generates a difference value between these two regions. In one embodiment, this comparison of regions and generation of a difference value comprises the calculation of the sum of the absolute differences between the two regions, as is well-known in the art. In another embodiment, this comparison of regions and generation of a difference value comprises the calculation of the mean square error between the two regions, which is also well-known in the art. Therefore, a difference value is generated for each set of regions (i.e., the region from the sharpened image and the corresponding region from the unsharpened image) so as to correspond to each edge pixel. In other words, there is a difference value associated with each edge pixel.

In block 310, the difference value for each set of regions for each edge pixel is processed to form a final image. The difference values are processed to determine whether to accept or reject the new sharpened value for an edge pixel. In one embodiment, the formation of the final image includes the selection of the edge pixel in the sharpened image to be used in the formation of the final image upon determining the difference value is less than a predetermined threshold (block 312). Conversely, the formation of the final image includes the selection of the edge pixel in the unsharpened image to be used in the formation of the final image upon determining the difference is greater than or equal to the predetermined threshold (block 314).

This predetermined threshold is chosen to reflect the level of noise (e.g., compression and system noise)—the greater the noise, the lower the threshold and vice versa. The assumption is made that if the change between the unsharpened region and the sharpened region is large enough (i.e., the threshold value is exceeded), it is due to noise in the data or the area is an edge boundary condition. Either way the sharpened value for any particular edge pixel is discarded in favor of the unsharpened value because otherwise there will be a dramatic difference in the appearance of the image.

In one embodiment, the unsharpened image includes a still image or a video frame within a video sequence. One reason for adaptive sharpening a image is to allow the size of the image to be scaled up (i.e., zoomed) while avoiding the "washed out" effect while at the same time de-emphasizing compression artifacts. Because zooming is a blurring process, in one embodiment the image is zoomed prior to the sharpening process. Therefore, the scaling up of the size of the image is performed prior to detecting the edges of the image in block 302. The zooming up of the image can also occur subsequent to the sharpening process. In this embodiment, the blurring process associated with the zooming of the image is accounted for by over sharpening the image.

Figure 4:
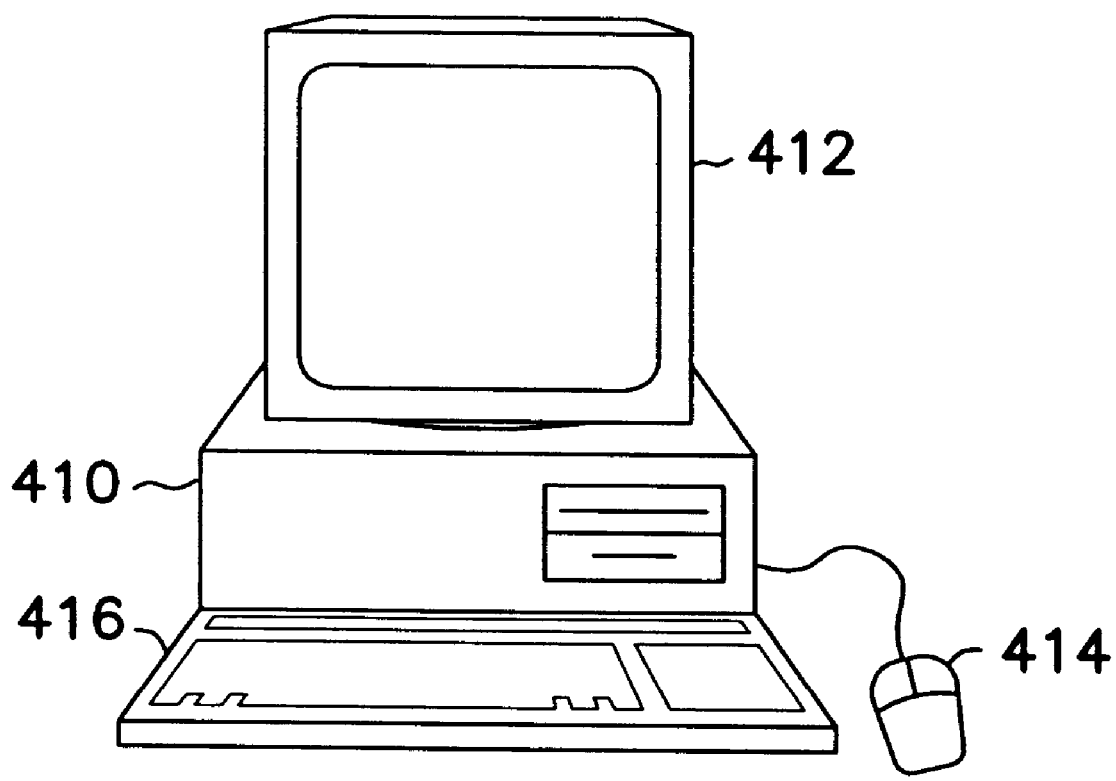
FIG. 4 is a diagram of a computer in conjunction with which embodiments of the invention may be practiced.

Referring finally to FIG. 4, a diagram of a representative computer in conjunction with which embodiments of the invention may be practiced is shown. It is noted that embodiments of the invention may be practiced on other electronic devices including, but not limited to a set-top box connected to the Internet. Computer 410 is operatively coupled to monitor 412 and pointing device 414. Computer 410 includes a processor (desirably, an Intel® Pentium® processor), random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 410. In one embodiment, computer 410 is a PC-compatible computer, running a version of the Microsoft® Windows® operating system. Residing on computer 410 is a computer readable medium storing a computer program which is executed on computer 410. Compression edge adaptive video and image sharpening and scaling performed by the computer program is in accordance with an embodiment of the invention.

The invention includes systems, methods, computers, and computer-readable media of varying scope. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof.

What is claimed is:

1. A method comprising:
   detecting an edge pixel in an unsharpened image;
   sharpening the edge pixel to form a sharpened image;
   selecting a region of the sharpened image, such that the region includes the edge pixel;
   comparing the region to a corresponding region of the unsharpened image to form a difference value; and
   processing the difference value to form a final image.

2. The method of claim 1, wherein processing the difference value comprises:
   selecting the edge pixel in the sharpened image upon determining the difference value is less than a predetermined threshold; and
   selecting the edge pixel in the unsharpened image upon determining the difference value is greater than or equal to the predetermined threshold.

3. The method of claim 1, wherein the unsharpened image is selected from a group consisting of a still image and a video frame within a video sequence.

4. The method of claim 1, further comprising scaling up the size of the unsharpened image prior to detecting the edge pixel in the unsharpened image.

5. The method of claim 1, wherein detecting the edge pixel in the unsharpened image comprises generating an edge map for the unsharpened image.

6. The method of claim 5, wherein creating the edge map for the unsharpened image comprises applying a two-dimensional (2-D) Sobel filter to a Y plane.

7. The method of claim 5, further comprising eliminating spurious edge points in the edge map.

8. The method of claim 7, wherein eliminating spurious edge points in the edge map includes median filtering of the edge map.

9. The method of claim 1, wherein sharpening the edge pixel to form the sharpened image comprises applying a 2-D sharpening filter to a Y plane of the edge pixel.

10. The method of claim 1, wherein sharpening the edge pixel to form the sharpened image comprises dynamic sharpening.

11. The method of claim 1, wherein the region of the sharpened image and the corresponding region of the unsharpened image comprises a 5×5 region.

12. A method comprising:
    detecting a plurality of unsharpened edge pixels in an unsharpened image;
    sharpening the plurality of unsharpened edge pixels in the unsharpened image to form a sharpened image having sharpened edge pixels;
    selecting a plurality of sharpened regions of the sharpened image, such that each region includes a sharpened edge pixel from the plurality of sharpened edge pixels;
    comparing each region to the corresponding region of the unsharpened image to form a plurality of difference values, such that each difference value corresponds to each comparison; and
    forming a final image, wherein each sharpened edge pixel is used to form the final image upon determining the corresponding difference value is less than a predetermined threshold, and wherein each unsharpened edge pixel is used to form the final image upon determining the corresponding difference value is greater than or equal to the predetermined threshold.

13. The method of claim 12, further comprising scaling up the size of the unsharpened image prior to detecting the edge pixel in the unsharpened image.

14. A system comprising:
    an edge detector capable of receiving an unsharpened image and detecting an edge pixel in the unsharpened image;
    an image sharpener capable of receiving the edge pixel and sharpening the edge pixel to form a sharpened image;
    a region selector capable of receiving the sharpened image and selecting a region of the sharpened image, such that the region includes the edge pixel;
    a region comparator capable of receiving the region and a corresponding region of the unsharpened image and comparing the region to the corresponding region to form a difference value; and
    a component capable of receiving the difference value and processing the difference value to form a final image.

15. The system of claim 14, wherein the component is capable of selecting the edge pixel in the sharpened image upon determining the difference value is less than a predetermined threshold, and wherein the component is capable of selecting the edge pixel in the unsharpened image upon determining the difference value is greater than or equal to the predetermined threshold.

16. The system of claim 14, further comprising an image scaler capable of receiving the unsharpened image and scaling up the size of the unsharpened image prior to detecting the edges in the unsharpened image.

17. The system of claim 14, wherein the edge detector comprises an edge-map generator for creating an edge map for the unsharpened image.

18. The system of claim 14, wherein the image sharpener comprises a mechanism for dynamic sharpening.

19. The system of claim 14, wherein the region of the unsharpened image and the corresponding region of the sharpened image comprise a 5×5 region.

20. A system comprising:
    an edge detector capable of receiving an unsharpened image and detecting a plurality of edge pixels in the unsharpened image;
    an image sharpener capable of receiving the plurality of edge pixels and sharpening the plurality of edge pixels to form a sharpened image having sharpened edge pixels;
    a region selector capable of receiving the sharpened image and selecting a plurality of regions of the sharpened image, such that each region includes a sharpened edge pixel from the plurality of sharpened edge pixels.
    a region comparator capable of receiving the plurality of regions and a plurality of corresponding regions of the unsharpened image and comparing each region to the corresponding region of the unsharpened image to form a plurality of difference values, such that each difference value corresponds to each comparison; and
    a component capable of receiving each difference value and processing each difference value to form a final image, wherein each sharpened edge pixel is used to form the final image upon determining the corresponding difference value is less than a predetermined threshold, and wherein each unsharpened edge pixel is used to form the final image upon determining the corresponding difference value is greater than or equal to the predetermined threshold.

21. An article comprising a computer readable medium having a computer program stored thereon for execution on a computer with instructions to:

detect an edge pixel in an unsharpened image;

sharpen the edge pixel to form a sharpened image;

select a region of the sharpened image, such that the region includes the edge pixel;

compare the region to a corresponding region of the unsharpened image to form a difference value; and process the difference value to form a final image.

22. The article of claim 20, wherein to detect the edges in the unsharpened image comprises to create an edge map for the unsharpened image.

23. The article of claim 20, wherein the region of the unsharpened image and the corresponding region of the sharpened image comprise a 5×5 region.

* * * * *

UNITED STATES PATENT AND TRADEMARK OFFICE
CERTIFICATE OF CORRECTION

PATENT NO. : 6,330,372 B1 Page 1 of 1
DATED : December 11, 2001
INVENTOR(S) : Goldstein et al.

It is certified that error appears in the above-identified patent and that said Letters Patent is hereby corrected as shown below:

Column 3,
Line 42, delete "tuncable" and insert -- tuneable --, therefor.

Signed and Sealed this

Tenth Day of August, 2004

JON W. DUDAS
*Acting Director of the United States Patent and Trademark Office*